United States Patent [19]

Kestner

[11] 4,195,942
[45] Apr. 1, 1980

[54] LATTICE CONSTRUCTION AND CONNECTING DEVICE THEREFOR

[76] Inventor: Mark O. Kestner, 7 Hampshire Dr., Mendham, N.J. 07945

[21] Appl. No.: 872,344

[22] Filed: Jan. 25, 1978

[51] Int. Cl.² .............................................. F16B 2/20
[52] U.S. Cl. ..................................... 403/13; 403/391
[58] Field of Search ............... 403/391, 385, 399, 400, 403/13; 52/DIG. 10, 685, 686, 719, 665; 24/81 CR; 46/29; 35/18 A

[56] References Cited

U.S. PATENT DOCUMENTS

| | | | |
|---|---|---|---|
| 3,286,963 | 11/1966 | Bergman | 24/81 CR |
| 3,360,883 | 1/1968 | Glanzer | 403/385 |
| 3,662,486 | 5/1972 | Freedman | 52/DIG. 10 |

FOREIGN PATENT DOCUMENTS

| | | | |
|---|---|---|---|
| 1143062 | 1/1963 | Fed. Rep. of Germany | 403/400 |
| 1216638 | 11/1959 | France | 46/29 |
| 1073746 | 6/1967 | United Kingdom | 52/719 |

*Primary Examiner*—Andrew V. Kundrat
*Attorney, Agent, or Firm*—Bruce D. Sunstein

[57] ABSTRACT

A device is used to connect one rod to at least one other object, such as another rod. This device can be used in accordance with a claimed method to form a lattice, such as an equipment lattice, made of a plurality of rods and at least one connecting device. The device employs a channel to permit press-fitting a rod into the channel. In a preferred embodiment, the device has a tetrahedral body with two orthogonal channels.

3 Claims, 3 Drawing Figures

LATTICE CONSTRUCTION AND CONNECTING DEVICE THEREFOR

BACKGROUND AND SUMMARY OF THE INVENTION

The present invention relates to the construction of an equipment lattice (commonly used in chemical laboratories) and like structures from one or more connecting devices.

Equipment lattices are commonly known and regularly used in chemical laboratories. Conventional lattices employ metallic connectors having two orthogonal holes or channels to receive joining or coupling rods. Conventional rods for one type of equipment lattice are sold under the trademark "Flexaframe" by Fisher Scientific Company, which also sells connectors under the trademark "Castalloy". The rods are secured in position in the connectors by means of set screws located along the connectors. An equipment lattice so constructed is commonly used to support experimental apparatus such as laboratory glassware, which is attached to the equipment lattice by means of various types of clamps.

Likewise it is common practice to support experimental apparatus by means of a support arm consisting of a metallic rod, fitted at one end with a means for grasping or holding the apparatus, and, at the other end, a means for attaching the support arm to a ring stand. A ring stand generally comprises a single vertically oriented rod fitted into a supporting base. In order to attach the support arm to the rod of the ring stand the prior art utilizes the same kind of metallic connector as has been described above in connection with equipment lattices. Hereinbelow, a "lattice" shall refer to any two or more rods joined by one or more connectors or connecting devices.

Owing to the design of prior art connectors, the joining of cylindrical rods with the connectors requires the use of additional tools such as screwdrivers, wrenches, and the like. In addition, prior art connectors are susceptible to corrosion and other phenomena, making the disassembly of rods joined with metallic connectors difficult and, in extreme cases, impossible.

A principal object of the present invention is to provide a device and method for connecting rods to one another in such a fashion that assembly and disassembly can be accomplished without the need for tools.

Another object of the invention is to provide a connecting device that is relatively immune from corrosion and similar phenomena.

A further object of the invention is to provide a connecting device that is virtually impossible to jam.

A further object of the invention is to provide a device and method for connection of one rod to another in such a fashion that the connection is essentially stationery, but static equilibrium of the connection can be temporarily disturbed to cause one rod to rotate about the other without adjustment of the connecting device and without adverse effect on subsequent stability of the assembly in its new orientation.

These and other objects of the invention are achieved by providing a connecting device having a body of a resilient material in which there have been formed one or more channels, each of which is straight and open-ended. In a preferred embodiment of the device, the body is tetrahedral, and there are two channels located along two nonadjacent edges of the body.

There is also provided a method of constructing a lattice of rods, which is practiced by press-fitting together a rod with the device of the invention, utilizing one channel thereof; press-fitting together another rod with the same device, utilizing another channel thereof, so that the two rods are mechanically connected to each other at right angles to one another; and continuing, to the extent and in the manner desired, press-fitting together additional connecting devices and rods with one another until the lattice has been formed.

BRIEF DESCRIPTION OF THE DRAWINGS

These and other objects and features of the invention will be more readily understood from a consideration of the following detailed description, taken with drawings in which.

DESCRIPTION OF SPECIFIC EMBODIMENTS

Figure 1:
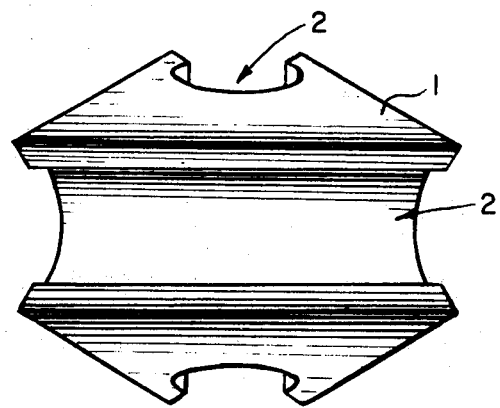
FIG. 1 is a perspective view, of a preferred embodiment of the device according to the invention, taken through a plane that is above and parallel to a channel in the device.

A preferred embodiment of the device constructed in accordance with the invention is shown in FIG. 1, in which is depicted a tetrahedral body 1 having mutually orthogonal open-ended channels 2 located along two non-adjacent edges of the tetrahedral body. The body 1 must be of a resilient material. Preferably, the body 1 is formed of a material that is not susceptible to corrosion or similar phenomena; suitable materials include polyethylene or polypropylene.

Figure 2:
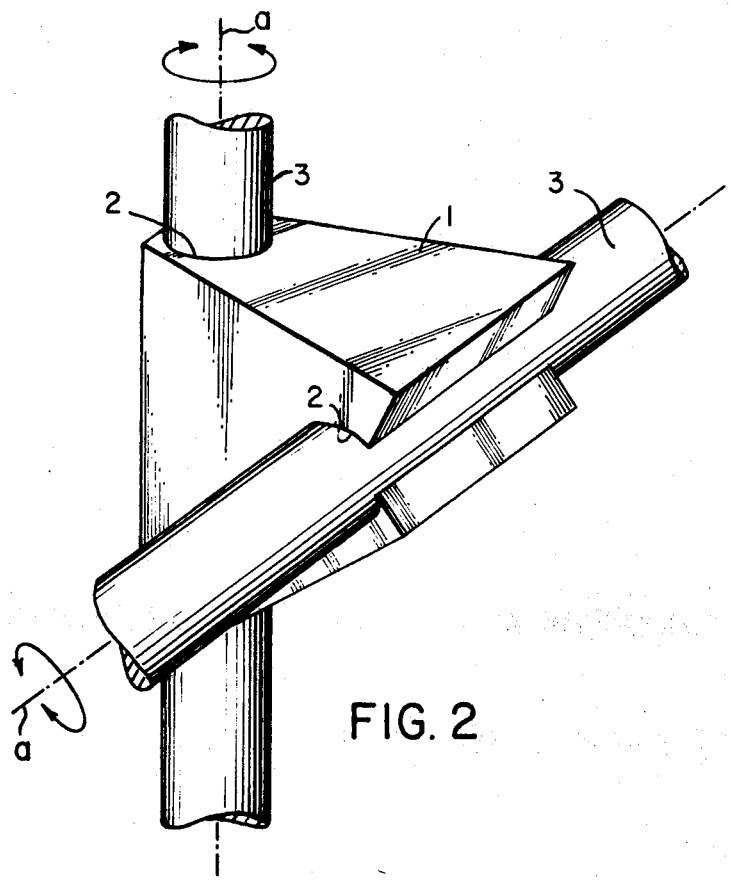
FIG. 2 is another view of the same preferred embodiment of the device, showing it having connecting rods press-fitted into the channels thereof.

FIG. 2 shows cylindrical rods 3 press-fitted into the channels 2 of the device shown in FIG. 1. As can be observed in FIG. 2, the cylindrical rods 3 press-fitted into the channels may be rotated about their long axis aa or moved laterally along axis aa. It will be understood that the rotational and lateral motions of rods 3 in channels 2 is important to the operation of certain chemical apparatus, such as a Schlenk cross or a leveling bulb. The channels are designed to be of suitable dimensions to cause the rods to be gripped by the channel walls. The gripping force of the device can be affected somewhat by the size of the channel relative to the size of the rod to be press-fitted therein, and thus differing gripping forces can be designed for differing applications. Using standard rods, [approximately one-half inch (13 mm) in diameter] of the type commonly used to make laboratory equipment lattices, and connected at right angles by means of the connecting device in accordance with the invention, the device has been able to support a weight of up to 22 lbs (10 kg) on a 5 inch (13 cm) lever arm without slipping.

Figure 3:
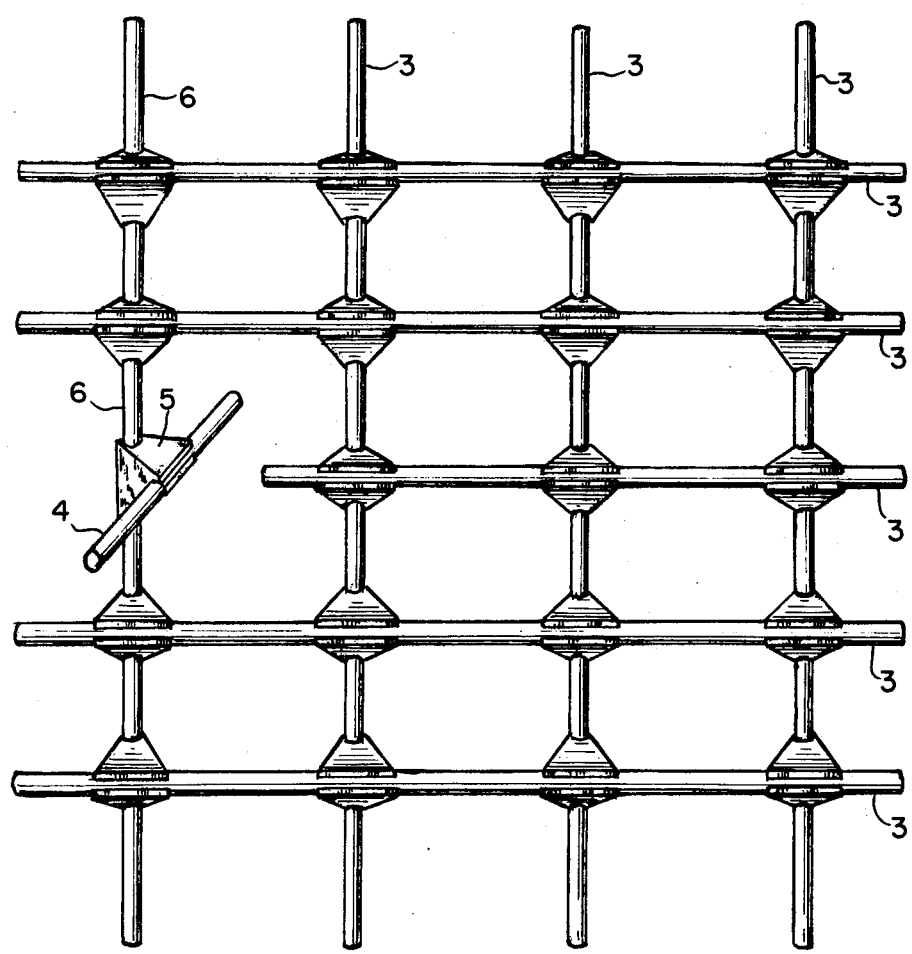
FIG. 3 is an illustration of an equipment lattice constructed of a plurality of the connecting devices of FIGS. 1 and 2, in combination with a plurality of rods.

FIG. 3 illustrated an equipment lattice constructed of a plurality of the connecting devices of FIGS. 1 and 2 and of cylindrical rods 3. As can be observed in FIG. 3, a rod 4 may be fitted into a connecting device piece 5 so as to mount the rod 4 at some angle to the plane of the equipment lattice. The angle may be a right angle or any other angle. It will be understood that a means of gripping or holding laboratory apparatus may be attached to one end or both ends of rod 4.

It will also be understood from FIG. 3 that connecting device 5 is free to be rotated about or moved laterally along rod 6.

The use of the connecting device in the construction of an equipment lattice is intended to serve as an example and it will be understood that the use of the connecting device is not restricted to the construction of equipment lattices but may be usefully applied to the connection of rods in other types of related structures.

Accordingly, while the invention has been described with particular reference to specific embodiments thereof in the interest of complete definiteness, it will be understood that it may be embodied in a variety of forms diverse from those shown and described without departing from the spirit and scope of the invention as defined by the following claims.

I claim:

1. A device for connecting crossed rods, such device comprising:
   a body, of resilient material and having a predominantly tetrahedral shape, in which there have been formed two straight, open-ended channels, located along two non-adjacent edges of the body, in such a way that walls of each such channel are capable of gripping one of the rods each of said channels encompassing an arc of more than 180° and terminating in opposed edges defining the open end therof and with each edge of a respective channel also defining the edge of a beveled face extending from an opposite face of the tetrahedron and beveled inwardly toward the channel and the opposite beveled face.

2. The device of claim 1, wherein the body is of polypropylene.

3. The device of claim 1, wherein the body is of polyethylene.